US007752129B2

(12) United States Patent
Bent et al.

(10) Patent No.: US 7,752,129 B2
(45) Date of Patent: *Jul. 6, 2010

(54) SYSTEMS AND METHODS FOR MANAGING CLIENT ACCOUNTS

(75) Inventors: Bruce Bent, Plandome, NY (US); Bruce Bent, II, New York, NY (US)

(73) Assignee: Island Intellectual Property LLC, New York, NY (US)

( * ) Notice: Subject to any disclaimer, the term of this patent is extended or adjusted under 35 U.S.C. 154(b) by 663 days.

This patent is subject to a terminal disclaimer.

(21) Appl. No.: 09/677,535

(22) Filed: Oct. 2, 2000

(65) Prior Publication Data

US 2005/0108149 A1 May 19, 2005
US 2006/0212385 A2 Sep. 21, 2006
US 2007/0271174 A2 Nov. 22, 2007

Related U.S. Application Data

(63) Continuation-in-part of application No. 09/176,340, filed on Oct. 21, 1998, now Pat. No. 6,374,231.

(51) Int. Cl.
*G06Q 40/00* (2006.01)
(52) U.S. Cl. .................. 705/40; 235/379; 235/380; 235/385; 235/437; 235/470; 705/42; 705/45; 705/4; 705/35
(58) Field of Classification Search ............... 705/40, 705/42, 45, 4, 35; 235/379, 380, 385, 437, 235/470
See application file for complete search history.

(56) References Cited

U.S. PATENT DOCUMENTS 4,232,367 A 11/1980 Youden et al. ............ 364/408

4,346,442 A 8/1982 Musmanno ............ 364/408

(Continued)

FOREIGN PATENT DOCUMENTS

JP 10049590 2/1998

(Continued)

OTHER PUBLICATIONS

Promontory Interfinancial Network; http://www.promnetwork.com/index.html (2003).

(Continued)

*Primary Examiner*—Daniel S Felten
(74) *Attorney, Agent, or Firm*—Foley & Lardner LLP

(57) ABSTRACT

Providing interest to clients' deposited funds without limitation on the number of demand withdrawals from deposit accounts is accomplished by an administration system that keeps all of the records for the clients' deposits and withdrawals, calculates the total of the deposits and withdrawals for all clients, and uses the calculation to determine whether funds are deposited to or withdrawn from one or more deposit accounts in which all clients' deposit funds are kept. Clients can make unlimited withdrawals, such as by check, credit card, debit card, or electronic transfer, through the administrator. By placing the administrator as the holder of the deposit account(s), exemptions to the limitation on earning interest in demand accounts is facilitated; additionally, dispersing the deposit account funds among multiple banks allows the client to obtain FDIC insurance for all of the deposited funds, which may amount to insurance in excess of the statutory maximum allowed (presently $100,000.00).

70 Claims, 4 Drawing Sheets

U.S. PATENT DOCUMENTS

| | | | |
|---|---|---|---|
| 4,376,978 A | 3/1983 | Musmanno | 364/408 |
| 4,597,046 A | 6/1986 | Musmanno | 364/408 |
| 4,674,044 A | 6/1987 | Kamus | 364/408 |
| 4,694,397 A | 9/1987 | Grant | 364/408 |
| 4,700,297 A | 10/1987 | Hagel | 364/408 |
| 4,751,640 A | 6/1988 | Lucas et al. | 364/408 |
| 4,774,663 A | 9/1988 | Musmanno et al. | 364/408 |
| 4,953,085 A | 8/1990 | Atkins | 364/408 |
| 4,985,833 A | 1/1991 | Oncken | 364/408 |
| 5,126,936 A | 6/1992 | Champion et al. | 364/408 |
| 5,206,803 A | 4/1993 | Vitagliano | 364/408 |
| 5,220,501 A | 6/1993 | Lawlor et al. | |
| 5,235,507 A | 8/1993 | Sackler | 364/401 |
| 5,262,942 A | 11/1993 | Earle | 364/408 |
| 5,270,922 A | 12/1993 | Higgins | 364/408 |
| 5,291,398 A * | 3/1994 | Hagan | 364/408 |
| 5,297,032 A | 3/1994 | Trojan | 364/408 |
| 5,424,938 A | 6/1995 | Wagner et al. | |
| 5,631,828 A * | 5/1997 | Hagan | 395/204 |
| 5,644,727 A | 7/1997 | Atkins | |
| 5,671,363 A | 9/1997 | Cristofich | 395/237 |
| 5,689,650 A | 11/1997 | McClelland et al. | 705/36 |
| 5,710,889 A | 1/1998 | Clark | 395/244 |
| 5,765,144 A | 6/1998 | Larche | 705/38 |
| 5,774,880 A | 6/1998 | Ginsberg | 705/36 |
| 5,781,654 A | 7/1998 | Carney | 382/137 |
| 5,806,048 A | 9/1998 | Kiron et al. | 705/36 |
| 5,806,049 A | 9/1998 | Petruzzi | 705/36 |
| 5,812,987 A | 9/1998 | Luskin | 705/36 |
| 5,826,243 A | 10/1998 | Musmanno | 705/35 |
| 5,852,811 A | 12/1998 | Atkins | 705/35 |
| 5,864,685 A * | 1/1999 | Hagan | 395/235 |
| 5,878,258 A | 3/1999 | Pizi | 395/682 |
| 5,878,405 A | 3/1999 | Grant et al. | |
| 5,884,285 A | 3/1999 | Atkins | |
| 5,890,141 A | 3/1999 | Carney | 705/45 |
| 5,893,078 A | 4/1999 | Paulson | 705/35 |
| 5,903,881 A | 5/1999 | Schrader et al. | 705/42 |
| 5,905,974 A | 5/1999 | Fraser | 705/37 |
| 5,940,809 A | 8/1999 | Musmanno | 705/35 |
| 5,941,996 A | 8/1999 | Smith | 714/47 |
| 5,946,667 A | 8/1999 | Tull, Jr. et al. | 705/36 |
| 5,950,175 A | 9/1999 | Austin | 705/35 |
| 5,974,390 A | 10/1999 | Ross | 705/4 |
| 5,978,779 A | 11/1999 | Stein | 705/37 |
| 6,014,642 A | 1/2000 | El-Kadi et al. | 705/36 |
| 6,016,482 A | 1/2000 | Molinari | 705/35 |
| 6,026,438 A | 2/2000 | Piazza | 709/221 |
| 6,041,314 A | 3/2000 | Davis | |
| 6,044,371 A | 3/2000 | Person | 707/6 |
| 6,047,324 A | 4/2000 | Ford | 709/227 |
| 6,049,782 A | 4/2000 | Gottesman et al. | |
| 6,052,673 A | 4/2000 | Leon et al. | |
| 6,088,685 A | 7/2000 | Kiron et al. | 705/1 |
| 6,092,056 A | 7/2000 | Tull, Jr. et al. | 705/36 |
| 6,105,005 A | 8/2000 | Fuhrer | 705/35 |
| 6,108,641 A | 8/2000 | Kenna | 705/35 |
| 6,112,191 A | 8/2000 | Burke | |
| 6,119,093 A | 9/2000 | Walker et al. | |
| 6,131,810 A | 10/2000 | Weiss | 235/379 |
| 6,154,770 A | 11/2000 | Kostakos | 709/217 |
| 6,189,785 B1 * | 2/2001 | Lowery | 235/379 |
| 6,226,623 B1 | 5/2001 | Schein et al. | 705/35 |
| 6,317,783 B1 | 11/2001 | Freishtat et al. | |
| 6,374,231 B1 | 4/2002 | Bent et al. | |
| 6,970,843 B1 | 11/2005 | Forte | |
| 7,089,202 B1 | 8/2006 | McNamar et al. | |
| 7,103,556 B2 | 9/2006 | Del Rey et al. | |
| 7,133,840 B1 | 11/2006 | Kenna et al. | |
| 7,206,761 B2 | 4/2007 | Colvin | |
| 7,216,100 B2 | 5/2007 | Elliott | |
| 7,376,606 B2 | 5/2008 | Jacobsen | |
| 7,383,223 B1 | 6/2008 | Dilip et al. | |
| 7,440,914 B2 | 10/2008 | Jacobsen | |
| 2001/0032182 A1 | 10/2001 | Kumar et al. | |
| 2002/0007330 A1 | 1/2002 | Kumar et al. | |
| 2002/0069147 A1 | 6/2002 | Sheehan et al. | |
| 2002/0128951 A1 | 9/2002 | Kiron et al. | 705/37 |
| 2002/0161707 A1 | 10/2002 | Cole et al. | |
| 2002/0165757 A1 | 11/2002 | Lisser | |
| 2002/0178098 A1 | 11/2002 | Beard | |
| 2003/0023529 A1 | 1/2003 | Jacobsen | 705/35 |
| 2003/0135437 A1 | 7/2003 | Jacobsen | 705/35 |
| 2003/0149646 A1 | 8/2003 | Chen et al. | |
| 2003/0163403 A1 | 8/2003 | Chen et al. | |
| 2003/0177092 A1 | 9/2003 | Paglin | |
| 2003/0191702 A1 | 10/2003 | Hurley | |
| 2003/0236728 A1 | 12/2003 | Sunderji et al. | |
| 2004/0039674 A1 | 2/2004 | Coloma | |
| 2004/0107157 A1 | 6/2004 | Bleunven et al. | |
| 2004/0111361 A1 | 6/2004 | Griffiths et al. | |
| 2004/0128229 A1 | 7/2004 | Raines et al. | |
| 2004/0128235 A1 | 7/2004 | Kemper et al. | |
| 2004/0138974 A1 | 7/2004 | Shimamura et al. | |
| 2004/0153398 A1 | 8/2004 | Baumgartner et al. | |
| 2004/0162773 A1 | 8/2004 | Del Rey et al. | |
| 2004/0177036 A1 | 9/2004 | Nutahara et al. | |
| 2005/0044038 A1 | 2/2005 | Whiting et al. | |
| 2005/0091137 A1 | 4/2005 | Woeber | |
| 2005/0102225 A1 | 5/2005 | Oppenheimer et al. | |
| 2005/0102226 A1 | 5/2005 | Oppenheimer et al. | |
| 2005/0108120 A1 | 5/2005 | Malka et al. | |
| 2005/0108149 A1 | 5/2005 | Bent et al. | |
| 2005/0114246 A1 | 5/2005 | Coloma | |
| 2005/0154662 A1 | 7/2005 | Langenwalter | |
| 2006/0047593 A1 | 3/2006 | Naratil et al. | |
| 2006/0106703 A1 | 5/2006 | Del Rey et al. | |
| 2006/0155644 A1 | 7/2006 | Reid et al. | |
| 2006/0167773 A1 | 7/2006 | Yang et al. | |
| 2006/0213980 A1 | 9/2006 | Geller et al. | |
| 2006/0273152 A1 | 12/2006 | Fields | |
| 2007/0043666 A1 | 2/2007 | Burdette | |
| 2007/0118449 A1 | 5/2007 | De La Motte | |
| 2007/0255655 A1 | 11/2007 | Kemper et al. | |
| 2007/0271174 A2 | 11/2007 | Bent et al. | |
| 2007/0276752 A1 | 11/2007 | Whiting et al. | |
| 2007/0288400 A1 | 12/2007 | Menon | |
| 2008/0015985 A1 | 1/2008 | Abhari et al. | |
| 2008/0046358 A1 | 2/2008 | Holm-Blagg et al. | |
| 2008/0065532 A1 | 3/2008 | De La Motte | |
| 2008/0097899 A1 | 4/2008 | Jackson et al. | |
| 2008/0120228 A1 | 5/2008 | Bent et al. | |
| 2008/0133280 A1 | 6/2008 | Ziegler | |
| 2008/0133396 A1 | 6/2008 | De La Motte | |
| 2009/0006985 A1 | 1/2009 | Fong et al. | |
| 2009/0012899 A1 | 1/2009 | Friesen | |

FOREIGN PATENT DOCUMENTS

| | | |
|---|---|---|
| WO | WO 95/23379 | 8/1995 |
| WO | WO-99/18529 | 4/1999 |
| WO | WO-02/42952 | 5/2002 |
| WO | WO-2005/006111 | 1/2005 |

OTHER PUBLICATIONS

American Banker Online-New Pitch: Deposit Insurance Sharing, p. 1-4 (Jan. 21, 2003).

Heavyweight Funding, Bankers News, vol. 11, Issue 5, p. 1-2 Mar. 4, 2003.

Certificate of Deposit Registry Service: Keeping deposits in the corn patch; Banknews/Mar. 2003.

ABA to Approve System for Sharing Deposit Coverage, American Banker (Feb. 11, 2003).

Britt, Phil; "Struggling with Sweep Accounts", American's Community Banker, v6, n12, p. 18-23, Dec. 1997.
News article: "Regulators Support Demand Deposit Bill", Regulatory Compliance Watch—Mar. 9, 1998; p. 1; vol. 9, No. 10.
Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.
Bent, "Bruce Bent Makes Money Market Funds Act Like Bank Accounts," Equity BBDP, Oct. 5, 1998, 3 Sheets.
Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.
Britt, "Struggling with Sweep Accounts," America's Community Banker, vol. 6, No. 12, 11 Sheets, Dec. 1, 1997.
Chapelle, "Merrill's Rivals Say They, Too. Offer Services Beyond Banking," Securities Data Publishing On Wall Street, 2 Sheets, Feb. 1, 2003.
Chapelle et al. "Peering Into Tomorrow: At the Threshold of a New Century, Brokers and Others Discuss Where They were Going," Securities Data Publishing on Wall Street, 6 Sheets, Dec. 1, 1999.
Coyle, "A Look at commercial Demand Deposit Options," America's Community Banker, vol. 9, Issue 2, Bell & Howell Information and Learning Company, 9 Sheets, Feb. 1, 2000.
Crockett, "Big Banks Found Stepping Up Marketing of 'Sweep' Accounts," American Banker, vol. 159, No. 198, American Banker Inc., 3 Sheets, Oct. 13, 1994.
Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.
Hoffman, "Reserve's FDIC-Insured Account Draws Regionals; But some see little need for insurance," Crain Communications Inc., Investment News, 2 Sheets, Jun. 4, 2001.
Keenan, "Tapping Brokerages for Alternative to CDs," American Banker, The Financial Services Daily, 3 Sheets, Feb. 18, 2004.
Lavine, "Check Out High-Yield Checking Accounts," Broward Daily Business Review, vol. 39, No. 102, 2 Sheets, Apr. 27, 1998.
McReynolds, "The Power of Cash: Ho-hum cash can be great product (and lead to more business) in troubled times," Securities Data Publishing on Wall Street, 3'Sheets, Jun. 1, 2002.
McReynolds et al. "Unusual Products for Unusual Times," Securities Data Publishing on Wall Street, 6 Sheets, May 1, 2001.
Potter, "As Sweep Accounts Continue to Grow, So do Community Bank Options," America's Community Banker, vol. 9, Issue 8, Bell & Howell Information and Learning Company, 3 Sheets, Aug. 1, 2000.
Share, "New Service Skirts FDIC's $100K Limit," Dialog Web Command Mode, 2 Sheets, Jun. 13, 2003, http://www.dialogweb.com/cgi/dwclient.
Smith, "IBAA Won't Push Interest-Bearing Checking For Business: Says Too Few Members Want It," The American Banker, 2 Sheets, Apr. 18, 1996.
Stafford, "New Bank Program Allows $1 Million in Insured Deposits," Dialog Web Command Mode, 3 Sheets, Aug. 24, 2003, http://www.dialogweb.com/cgi/dwclient.
Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.
"Man Bites Dog: Funds Move Into Banking," IBC's Money Fund Selector, 2 Sheets, Nov. 6, 1998.
About iMoneyNet, Inc., About iMoneyNet's Money Funds Division, 4 Sheets, Aug. 21, 2003, http://www.ibcdata.com/about.htm.
"Reverse Ups Insurance Limit On Money Market Account," Thomson Financial Inc., Mutual Fund Market News, 1 Sheet, Aug. 26, 2002.
"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.

"The Bank of New York adds a $300,000 FDIC-Insured Money Market Account Option to its Dividend Income Checking Account," PR Newswire Associations, Inc., PR Newswire, 2 Sheets, Apr. 18, 2002.
The Reserve Fund, Study of U.S. Patent No. 6,374,231, 1 Sheet.
"Bank of Oak Ridge to Offer FDIC Insurance on up to $1.5 Million," Dialog Web Command Mode, 2 Sheets, Sep. 25, 2003, http://www.dialogweb.com/cgi/dwclient.
Reserve Management Corporation, Reserve Insured Deposits, U.S. Appl. No. 76/315,600, Issued.
The Reserve, "What Sets Us Apart," 2 Sheets, Oct. 4, 2006, http://www.ther.com/bank/bank_wsua.shtml.
The Reserve, "Reserve Insured Deposits," 2 Sheets, Oct. 4, 2006, http://www.ther.com/ps/ps_fif.shtml.
The Reserve, "Company History," 3 Sheets, Oct. 4, 2006, http://www.ther.com/aboutus/history.shtml.
The Reserve, "Reserve Insured Deposits Program," 2 Sheets, Oct. 4, 2006, http://www.ther.com/bank/bank_insdep.shtml.
Reserve Insured Deposits, United States Patent and Trademark Office, Reg. No. 2,694,910, Registered Mar. 11, 2003, 1 Sheet.
Mutual Funds Magazine, Bargain Basement Funds, Oct. 1997, 2 Sheets.
Mutual Funds Magazine, Bargain Basement Funds, Oct. 1997, 1 Sheet.
Money Fund Report, IBC Financial Data, Inc., Nov. 6, 1998, 1 Sheet.
Liberman et al., Market Watch, "How Important are Banks?" FDIC Insurance on Deposits Just One Continuing Advantage, Oct. 17, 2006, 3 Sheets.
Letter From William W. Wiles, Secretary of the Board, Board of Governors of the Federal Reserve System, Jun. 22, 1983, 6 Sheets.
DI 48, Excerpts of Transcript of Hearing, U.S. Dist. Ct., District of Delaware, Civil Action No. 82-680, Apr. 8, 1983, 5 sheets.
DI 56, Interrog. Response, U.S. Dist. Ct. District of Delaware, Civil Action No. 82-680, May 20, 1983, 15 Sheets.
DI 99, Suppl. Interrogatory Response, U.S. Dist. Ct., District of Delaware, Civil Action No. 82-630, May 30, 1984, 6 Sheets.
Letter from Michael Bradfield, General Counsel, Board of Governors of the Federal Reserve System, Nov. 16, 1984, 4 Sheets.
Board of Governors of the Federal Reserve System, 1984 Fed. Res. Interp. Ltr. LEXIS 56, Nov. 16, 1984, 3 Sheets.
Letter From Oliver I. Ireland, Associate General Counsel, Board of Governors of the Federal Reserve System, Jun. 22, 1988, 5 Sheets.
Board of Governors of the Federal Reserve System, 1988 Fed. Res. Interp. Ltr. LEXIS 141, Jun. 22, 1988, 3 Sheets.
Board of Governors of the Federal Reserve System, 1989 Fed. Res. Interp. Ltr. LEXIS 77, Mar. 14, 1989, 2 Sheets.
Board of Governors of the Federal Reserve System, 1989 Fed. Res. Interp. Ltr. LEXIS 154, Jun. 21, 1989, 2 Sheets.
Board of Governors of the Federal Reserve System, 1990 Fed. Res. Interp. Ltr. LEXIS 92, Feb. 1, 1990, 1 Sheet.
Board of Governors of the Federal Reserve System, 1991 Fed. Res. Interp. Ltr. LEXIS 232, Jan. 30, 1991, 2 Sheets.
CMA, The Merrill Lynch Cash Management Account Financial Service, Insured Savings Account Participating Depository Institutions, Merrill Lynch, Pierce, Fenner & Smith Incorporated, Nov. 1992, 2 Sheets.
Board of Governors of the Federal Reserve System, 1994 Fed. Res. Interp. Ltr. LEXIS 156, Jun. 24, 1994, 3 Sheets.
CMA, Insured Savings Account Fact Sheet, Merrill Lynch, Pierce, Fenner & Smith Incorporated, Jul. 1994, pp. 47-54.
Board of Governors of the Federal Reserve System, 1994 Fed. Res. Interp. Ltr. LEXIS 314, Oct. 17, 1994, 2 Sheets.
Board of Governors of the Federal Reserve System, 1994 Fed. Res. Interp. Ltr. LEXIS 419, Oct. 14, 1994, 4 Sheets.
CMA, The Merrill Lynch Cash Management Account Financial Service, Insured Savings Account Participating Depository Institutions, Merrill Lynch, Pierce, Fenner & Smith Incorporated, Mar. 1995, 2 Sheets.
Letter from Stephanie Martin, Assoc. General Counsel, Board of Governors of the Federal Reserve System, Apr. 22, 2004, 8 Sheets.
Bank Deposit Program, Online http://web.archive.org/web/20030620100115/http:/www.smithbarney.com/products_servi, Jan. 19, 2001, 4 Sheets.

Lawsuit by Island Intellectual Property LLC, Lids Capital LLC, and Double Rock Corporation against Promontory Interfinancial Network, LLC and MBSC Securities Corporation, including Cover Sheet, Summons, Complaint and Rule 7.1 Statement, Mar. 24, 2009, Case No. 09 CV 2675.

Lawsuit by Island Intellectual Property LLC, Lids Capital LLC, and Double Rock Corporation against Deutsche Bank AG, Deutsche Bank Trust Company Americas and Total Bank Solutions, LLC, including Cover Sheet, Summons, Complaint and Rule 7.1 Statement, Mar. 24, 2009, Case No. 09 CV 2677.

Lawsuit by Promontory Interfinancial Network, LLC against Double Rock Corporation p/k/a Reserve Management Corporation, Complaint, Mar. 24, 2009, Civil Action No. 1:09 CV 316.

Lawsuit by Promontory Interfinancial Network, LLC against Double Rock Corporation p/k/a Reserve Management Corporation and Lids Capital LLC, Amended Complaint, Mar. 27, 2009, Civil Action No. 1:09 CV 316.

Lawsuit by Island Intellectual Property LLC, Lids Capital. LLC, Double Rock Corporation and Intrasweep LLC, against Promontory Interfinancial Network, LLC, Deutsche Bank AG, Deutsche Bank Trust Company Americas and Total Bank Solutions, LLC, Complaint, Apr. 14, 2009, Case No. 09 CV 3750.

Lawsuit by Promontory Interfinancial Network, LLC against Double Rock Corporation, p/k/a Reserve Management Corporation, Island Intellectual Property LLC and Lids Capital LLC, including Cover Sheet, Summons and Complaint, Apr. 14, 2009, Civil Action No. 3:09 CV 217.

Lawsuit by Promontory Interfinancial Network, LLC against Double Rock Corporation p/k/a Reserve Management Corporation, Island Intellectual Property LLC, Lids Capital LLC and Intrasweep LLC, Amended Complaint, Apr. 15, 2009, Civil Action No. 3:09 CV 217.

12 CFR Part 329—Interest on Deposit, Source 51 FR 10808, Mar. 31, 1986, 5 Sheets.

AB 2011 Assembly Bill—Bill Analysis, Senate Amendments, http://www.leginfo.ca.gov/pub/bill/asm/ab_2001-2050/ab_2011_cfa_20060811_161755_asm_floor.html, 2006, pp. 1-3.

AB 2011 Assembly Bill—Bill Analysis, Senate Rules Committee, Third Reading, http://www.leginfo.ca.gov/pub/bill/asm/ab_2001-2050/ab_2011_cfa_20060705_161454_sen_floor.html, 2006, pp. 1-7.

AB 2011 Assembly Bill—Chaptered, http://www.leginfo.ca.gov/pub/bill/asm/ab_2001-2050/ab_2011_bill_20060925_chaptered.html, 2006, pp. 1-3.

AB 2011 Assembly Bill—Enrolled, http://www.leginfo.ca.gov/pub/bill/asm/ab_2001-2050/ab_2011_bill_20060816_enrolled.html, 2006, pp. 1-3.

AB 2011 Asssembly Bill—History, Complete Bill History, http://www.leginfo.ca.gov/pub/bill/asm/ab_2001-2050/ab_2011_bill_20060925_history.html, 2006, p. 1.

Announcing Changes in Automatic "Sweep" Investment Options, LPL Financial Services, Linsco/Private Ledger, Member NASD/SIPC, 26 Sheets.

California Independent Bankers, ICBA Independent Community Bankers of America, Banker Bulletin, 2006, CIB 16th Annual Convention, vol. 4, issue 6, http://www.cib.org/banker_bulletin.htm.

Capital Briefs: Corporate Checking Account Relief Sought, American Banker, vol. 162, Jul. 28, 1997, 1 Sheet.

CMA, Insured Savings Account Fact Sheet, Merrill Lynch, Pierce, Fenner & Smith Incorporated, 1997, pp. 49-57.

CMA, The Investor Credit Line Service, Cost-Effective Financing for the '90s, Merrill Lynch, Pierce, Fenner & Smith Incorporated, 1997, pp. 36-46.

CMA, The Merrill Lynch Cash Management Account Financial Service, Merrill Lynch, Pierce, Fenner & Smith Incorporated, Jan. 1997, 35 Sheets.

Deposit Growth Strategies For Financial Institutions, New Sweep Account Helps Retain $40 Million in Business Deposits, vol. 7, No. 12, The Reserve Funds, May 2001, 1 Sheet.

FDIC Federal Register Citations: Email from Bert Ely to Comments, Mar. 8, 2006, Subject: Large-Bank Deposit Insurance Determination Proposal- RIN 3064-AC98—Regs@fdic.gov. Attached, also from FDIC Federal Register Citations: Email From American Banker, by Bert Ely, Feb. 24, 2006, Viewpoint: FDIC's Account-Link Plan a Pointless, Costly Threat.

FDIC, Federal Deposit Insurance Corporation, Letter to Mr. Ronald Rexter, Feb. 28, 2003, From Michelle M. Borzillo, Counsel Supervision and Legislation Section, 2 Sheets.

Financial Services Industry, "Web Watch: Trading Company Bundles CDs For Better Rates," Community Banker, Jun. 2002, online, http://findarticles.com/p/articles/mi_qa5344/is_200206/ai_n21313883/.

Finistar, Providing FDIC Insured Funds as a Stable Source of Deposits to Commercial Banking Institutions, 16 Sheets, www.Finistar.com.

Frost Bank, Member FDIC, Checking Accounts, 1 Sheet, Sep. 19, 2003, https://www.frostbank.com/cgi-bin/ecomm/frost1/scripts/products/product_detail.jsp?BV_....

Insured Cash Account Program Disclosure Booklet, LPL Financial Services, Linsco/Private Ledger, Member NASD/SIPC, 14 Sheets.

In The Know, Important Information About Your Account, Smith Barney Citigroup, 2005, 6 Sheets.

Letter From Joseph A. DiNuzzo, Counsel, Oct. 20, 1999, FDIC, Federal Deposit Insurance Corporation, 1 Sheet.

Letter From Roger A. Hood, Assistant General Counsel, Jul. 16, 1996, FDIC, Federal Deposit Insurance Corporation, Legal Division, 1 Sheet.

Letter From Jamey Basham, Attorney, LEXSEE 1990 FDIC Interp. Ltr., Lexis 1, Federal Deposit Insurance Corporation, FDIC-90-02, Jan. 3, 1990, 2 Sheets.

Letter From Merle Y. Waldman, LEXSEE 1985 Sec No- Act., Lexis 1593, Securities Exchange Act of 1934—Section 15(a), Jan. 8, 1985, 11 Sheets.

Letter To Mr. James E. Creekman, Group Vice President, From Oliver Ireland, Associate General Counsel, Aug. 1, 1995, 4 Sheets.

Letter To Mr. Jonathan L. Levin, Esq., From Oliver Ireland, Associate General Counsel, Oct. 18, 1996, 2 Sheets.

Letter To Mr. L.P. Fleming, Jr., Esq., From Oliver Ireland, Associate General Counsel, Feb. 7, 1995, 3 Sheets.

Letter To Ms. Brenda L. Skidmore, Senior Vice President, From Oliver Ireland, Associate General Counsel, Aug. 30, 1995, 4 Sheets.

Merriam-Webster Online Dictionary, 10th Edition, Definition of "Associated", 2 Sheets.

Merrill Lynch Announces Beyond Banking, The Power of Advice For Smarter Cash Management, Jan. 8, 2 Sheets.

Merrill Moves CMA Cash to Bank, Street Talk, On Wall Street, Nov. 2000, p. 26.

Merrill Lynch & You, Jan. 2000, "Financial Services The Way You Want, When You Want Them," 4 Sheets.

Merrill Lynch, Pierce, Fenner & Smith Incorporated, "Information Statement," 2000, 12 Sheets.

Money Fund Report, Bank of New York Adds Insured Sweeps Option, Friday, May 3, 2002, The Reserve Funds, 1 Sheet.

Money Fund Report, Insured Cash Sweep Options Proliferate, Friday, Jun. 1, 2001, The Reserve Funds, 1 Sheet.

Money Market Insight's, Goldman Sachs May Create Bank to Offer Insured Cash Sweeps, Aug. 2002 Issue, 3 Sheets.

Munk, Merrill Makes New Push Into Traditional Banking, Dow Jones Newswires, Jan. 3, 2003, 1 Sheet.

O'Brian, "Money-Market Funds Suit Many Investors, But Proud Creator Frets About Extra Risk," Re-Printed From The Wall Street Journal, Monday, Nov. 6, 2000, Dow Jones & Company, Inc., 2 Sheets.

On Wall Street, Helping Brokers Build A More Successful Business, The Power of Cash, Jun. 2002, 2 Sheets.

On Wall Street, Helping Brokers Build A More Successful Business, Unusual Products For Unusual Times, May 2001, 2 Sheets.

Online, www.usabancshares.com, Brave New World, 1999, 2 Sheets.

Part: 2, Monetary Policy and Reserve Requirements, Subpart—Regulation D, Board Interpretations of Regulation D, Transaction Accounts—Linked to Time Deposits, vol. 1, Federal Reserve Regulatory Service, 2 Sheets.

Ring, National /Global, "Amex Spans The Globe in Retail Bank Buildup," Nov. 27, 2000, 1 Sheet.

Sweeping Your Firm Into FDIC Insured Deposits, Harken Financial Services, Aug. 4, 2006, 8 Sheets.

Testimony of Bruce R. Bent, CEO of The Reserve Funds, Before The Financial Institutions and Consumer Credit Subcommittee House Financial Services Committee U.S. House of Representative, Hearing On H.R. 758 and H.R. 859, Mar. 5, 2003, 4 Sheets.

The Depository Trust Company, B#: 3875, Oct. 1, 2002, Settlement\Underwriting, From: Denise Russo, Director, Underwriting, 6 Sheets.

The Insured Savings Account, Issuer Guide to Offering MMDAs Through Merrill Lynch, Merrill Lynch Money Markets, Inc., "Operational Guide To The Merrill Lynch MMDA Program 1986", Sep. 1986 3 Sheets.

The Reserve Funds, NJBA Endorses New Sweep Account Offers New Jersey Banks Deposit Growth, Retention, For Immediate Release, May 23, 2001, 1 Sheet.

The Reserve Funds, Objectives, Observations & Strategies For American Enterprises Inv., Oct. 18, 2000, 11 Sheets.

The Reserve Funds Press Release, "The Reserve Funds and Frontier Bank Partner to Offer Revolutionary Banking Product," 5 Sheets, Aug. 1, 2000.

The Reserve Funds, Reserve Management and Irwin Union Bank and Trust Company Partner to Offer The Reserve Return Sweep, For Immediate Release, Mar. 8, 2001, 2 Sheets.

The Unmatched Sweep Solution From The Cash Management Expert, 2 Sheets.

Waddell, "Sweeping Clean," Advisor, The Advisor to Advisors, 2 Sheets.

Lawsuit by Island Intellectual Property LLC, Intrasweep LLC and Double Rock Corporation against Deutsche Bank AG, Deutsche Bank Trust Company Americas and Total Bank Solutions, LLC, Complaint for Patent Infringement, May 19, 2009, Case No. 09 CIV 4673.

Lawsuit by Promontory Interfinancial Network, LLC against Double Rock Corporation p/k/a Reserve Management Corporation, Island Intellectual Property LLC, Lids Capital LLC and Intrasweep LLC, Complaint, May 19, 2009, Civil Action No. 3:09 CV 322.

Lake Forest Bank & Trust Company, Introducing MaxSafe Deposit Accounts with up to $3.75 Million in FDIC Insurance, www.lakeforestbank.com/maxsafe, 2 Sheets.

Seven Times the Security of a Normal CD, Introducing our MaxSafe CD, 4 Sheets.

Introducing our MaxSafe CD with up to $700,000 of FDIC Insurance, 4 Sheets.

* cited by examiner

SYSTEMS AND METHODS FOR MANAGING CLIENT ACCOUNTS

This application is a continuation-in-part of application Ser. No. 09/176,340, filed 21 Oct. 1998, now U.S. Pat. No. 6,374,231 the entirety of which disclosure is incorporated herein by reference.

BACKGROUND OF THE INVENTION

1. Field of the Invention

This invention generally relates to the field of account transaction processing, and more specifically, an improved system for processing and administering a demand account or money market account in combination with an insured deposit account, and optionally where the accounts are distributed over a plurality of banking institutions.

2. The State of the Art

The Federal Deposit Insurance Corporation ("FDIC") is a federal governmental entity that provides insurance for deposits in most banks and savings institutions in the United States Bank deposits are insured by the FDIC's Bank Insurance Fund ("BIF") and savings institutions' deposits are insured by the FDIC's Savings Association Insurance Fund ("SAIF"). The rules governing insurance of deposits of institutions insured by the BIF and the SAIF are the same. The FDIC bases insurance coverage on the concept of ownership rights and capacities: funds held in different ownership categories are insured separately from each other; and funds owned by the same entity but held in different accounts are subsumed under the same insurance coverage. The amount of insurance coverage provided to depositors of each institution insured by BIF and SAIF is the same: $100,000.00 to the owners(s) of the funds in the account(s), including principal and interest.

As disclosed in our prior application Ser. No. 09/176,340 referenced above, a system is provided for managing a plurality of demand accounts for multiple clients whose funds are held at a banking institution in a single insured deposit account. That system provides an entity with the ability to deposit funds into a demand account from various sources, and to make payments from the demand account via different instruments, without the limitation as to the number of transfers, and still earn interest on the funds in the clients' accounts because the funds are effectively maintained in a deposit account. Even with the above-mentioned innovative system, investors carrying amounts in excess of $100,000 in their accounts are disadvantaged because the FDIC insurance is limited to $100,000, so any amount over $100,000 is not protected by FDIC insurance. It was with this realization that the present invention was made.

OBJECTS AND SUMMARY OF THE INVENTION

One object of the present invention is to provide a system for managing a plurality of demand accounts for multiple clients whose funds are held at a banking institution in a single insured deposit account.

Another object of the present invention to is provide a system for managing a plurality of demand accounts for multiple clients whose funds are held at one or more banking institutions in one or more single insured deposit accounts that, from the viewpoint of the investor, removes the $100,000 limitation of FDIC insurance for that individual investor.

Still a further object of the present invention is to provide a system for administering a plurality of accounts containing in excess of $100,000 and continue to qualify for FDIC insurance.

These and other objects are achieved by providing a system that administers individual client deposits to and withdrawals from each of their demand accounts. The system includes a database having each client's information for each account administered. The system monitors the use of the funds from each account by selectively authorizing or rejecting each demand payment request for each account of a particular client. Periodically, net transaction information is determined from the sum of the demand account deposits and withdrawals. The net transaction information is used to determine whether to deposit funds or to withdraw funds from a single deposit account to a client's demand account(s) while updating the database for each client's deposit and authorized demand payment. The system then determines whether each client's account contains more than a specified amount (e.g., $90,000) and distributes any amounts over the specified amount into another account at a preselected banking institution.

In practice, when an investor's account balance exceeds $90,000 in any one account, the excess funds are automatically moved to a second deposit account at another preselected bank. The client will maintain one insured deposit clearance account while the multiple deposit accounts will be transparent to the investor. All transactions to and from the accounts will post to the investor's insured deposit account, although they may be debited from multiple deposit accounts held at various banks. At the time an Insured Deposit Account is opened, the investor is given the option to choose a preferred bank, to chose a list of preferred banks in a desired (or random) order of preference, and to exclude one or more banks. The system will debit and credit the multiple deposit accounts on the investor's behalf, and in the event that the investor does not preselect a bank, the system will automatically designate a bank or banks. The client may also select the order of preference for deposits and withdrawals. For example, if the investor opened his Insured Deposit Account with $170,000, he could also indicate that his assets should be invested in Bank A and Bank C. He may also indicate that bank C is preferred. In this example, $90,000 would be deposited into Bank C and $80,000 into Bank A. If a check were written or the investor chose to redeem funds directly, the withdrawals would be made from Bank A. Withdrawals would not be made from Bank C until all funds had been redeemed from Bank A. Similarly, if the investor chose Bank C as preferred and chose to exclude Bank B, then $90,000 would be deposited into Bank C and $80,000 into Bank A. The investor also can choose the deposit cap for each of multiple banks selected, or can specify deposit caps for default banks chosen by the system (e.g., no bank to hold more than 40% of the investor's funds). Of course, the investor can also specify that all funds be held in a single bank, even if the amount exceeds $100,000. The report the investor receives may refer to all of the assets and transactions in the investor's Insured Clearance Account (a single account), or the investor may be shown a report listing all of the sub-accounts (if any) where the funds are held and in which transactions occurred.

The choice of Banks is held on the investor's account and the system will read the Bank indicator and determine which bank deposit account should be debited or credited. The system will automatically group together all transactions for each bank. At the end of the business day the deposit accounts at the various banks with be either debited or credited. The debit or credit to the deposit account is the net transaction for all activity that occurred that day.

As a result of the present invention the investor earns interest on the balance in his Insured Deposit Account where the interest rate earned can be the same regardless of the bank(s) selected, or may vary depending on the banks selected, while continuing to qualify his account funds for FDIC insurance.

BRIEF DESCRIPTION OF THE DRAWINGS

In the drawings, in which like references characters designate like or corresponding parts throughout the several views, the view are.

DETAILED DESCRIPTION OF SPECIFIC EMBODIMENTS

The present invention will be described with reference to an administrator, which can be a brokerage firm, a bank, or another financial entity with which clients can institute financial transactions such as deposits and demand payments. The administrator appears to each client as if it were, at least in part, a bank, by accepting deposits for the client's accounts and by authorizing (and then making) payments demanded by the client from his or her account. The funds for all of the clients are pooled into a single deposit account that is maintained as an insured deposit account at a licensed banking institution.

Figure 1A:
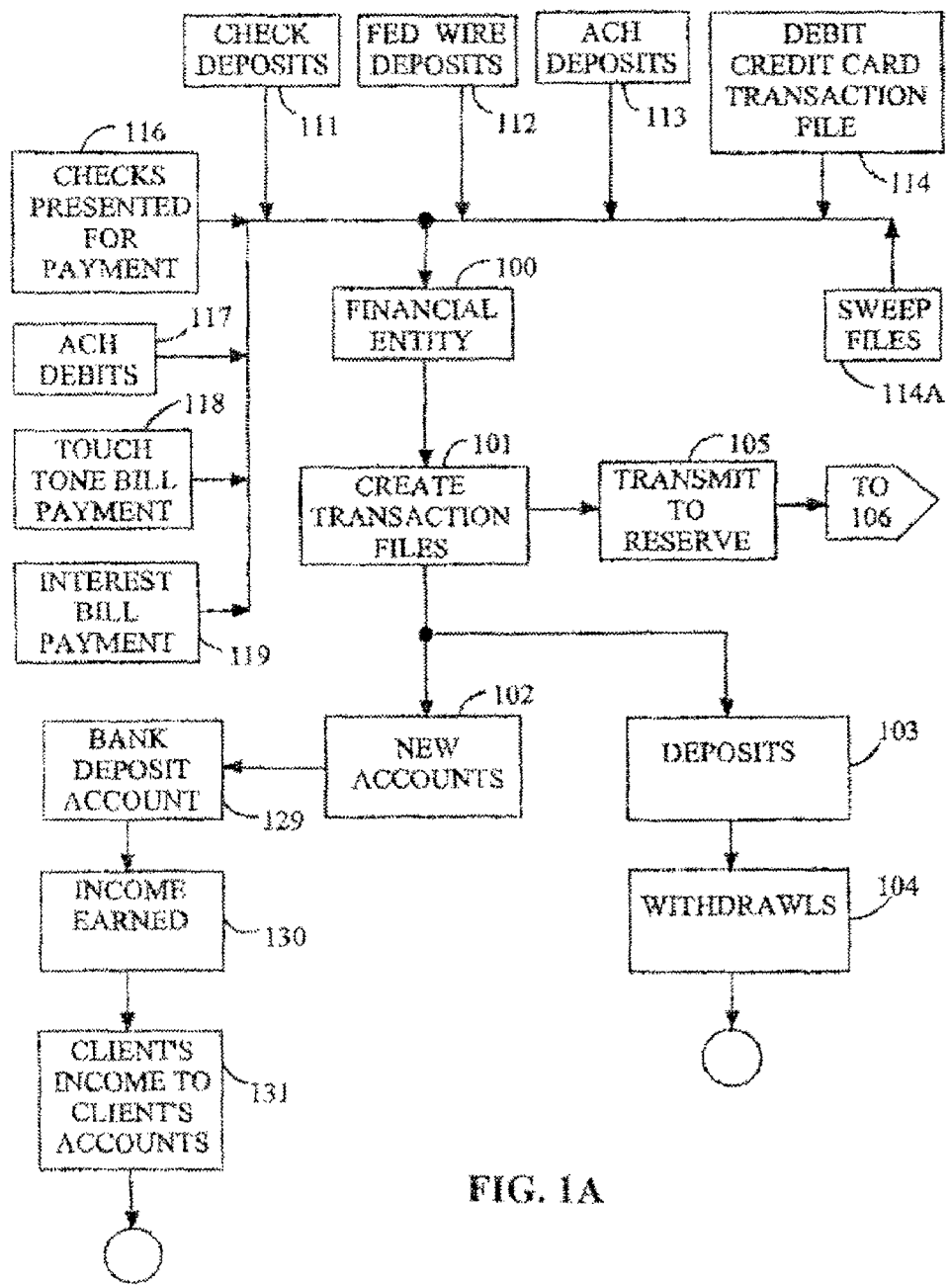
FIG. 1A is a flowchart depicting processing steps the system follows at the administrator's end.

Referring to FIG. 1A, the financial entity 100, which may be a bank, a brokerage or another entity where financial transactions take place or can be facilitated, creates transaction files 101 which are transmitted to Reserve 105; Reserve (or the Reserve System) is the administrator or other entity in charge of administering at least one of the deposit accounts. New account files 102 can be transmitted to Reserve; a new investor account may need to be opened; a new account means organizing and coordinating information to service a new investor for the present system, even though that investor may already be a client of a financial entity 100 for other investment vehicles. A new account 102 becomes part of an existing bank deposit account 129 that collects earned income 130 which transfers the client's income to the client's accounts 131; of course at some time the deposit account must be established with clients' funds. The transaction files represent the addition of funds by check (such as drawn on another institution, or a different demand account from the same institution), wire or electronic transfer, ACH, credits (such as from a debit or credit card merchant), or a sweep from one of the client's other accounts. Accordingly, encompassed in the transaction file are deposits 103 and withdrawals 104. A "sweep" includes the automatic transfer of funds, such as the automated transfer of interest from one account into the client's account, as well as the automated transfer of funds out of the client's account (such as for payment of a securities trade); thus, a sweep may be from one of the client's accounts to another. The responsibility for maintaining the deposit account can be assigned by the administrator to a third party.

Figure 1B:
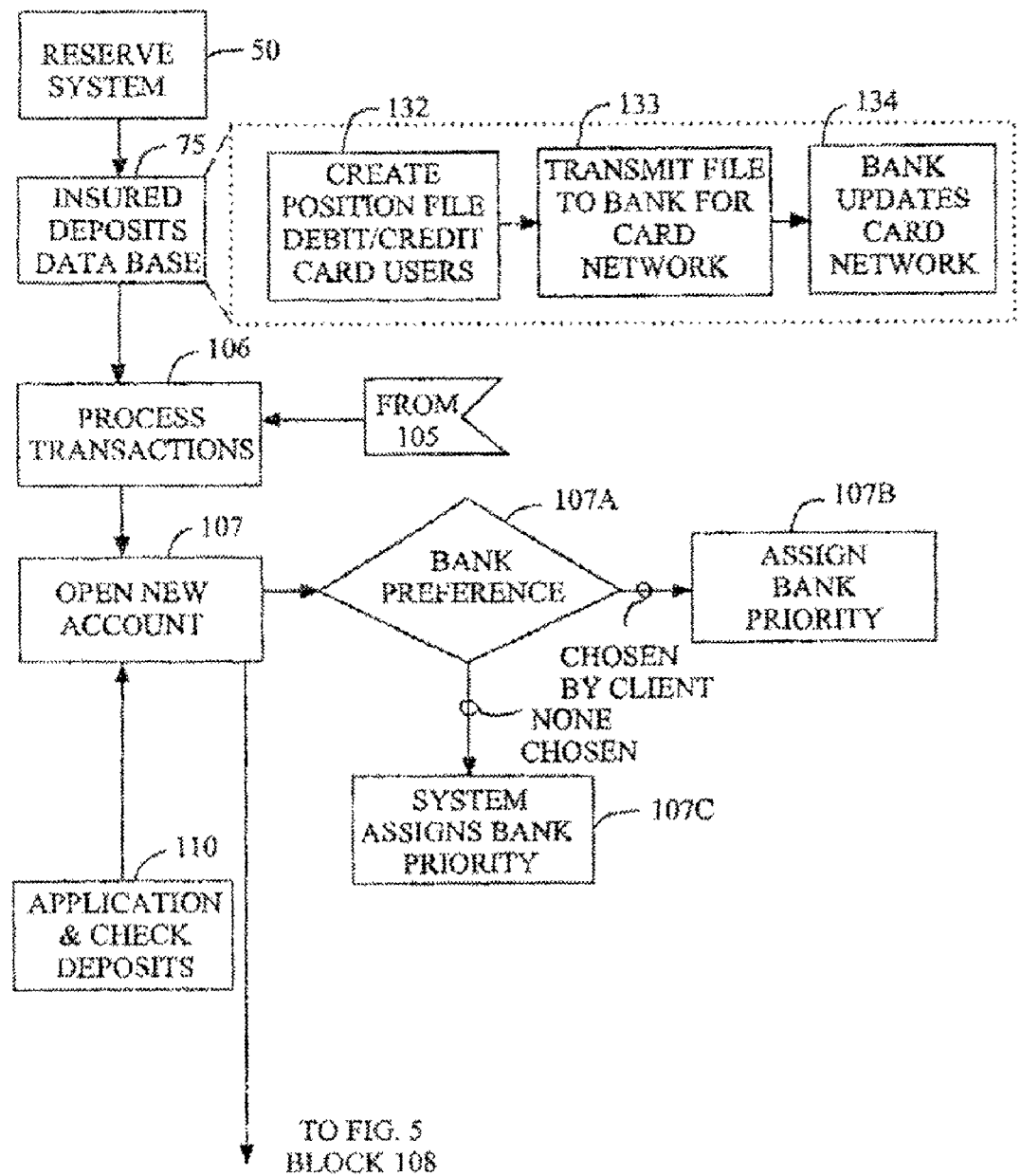
FIG. 1B is a flow chart depicting additional processing steps according to the present invention.

Referring now to FIG. 1B, the Reserve System 50 contains an insured deposit database 75 where a position file for debit/credit card users is created 132 and transmitted to a bank for a debit/credit card network 133 where the bank then updates the network 134. The system updates the data base 75 and processes transactions 106 (from 105, FIG. 1A) and opens a new account 107 where application and check deposits are processed 110. The bank preference 107A is the list of banks and the order of preference for deposits and withdrawals held on the account, including a list of banks to be excluded (if any), and the maximum percentage and/or amount of funds to be held in each bank. The client's bank preference data is added to the account at 107B. If the client does not select values for any of these variables, the system can provide default values for the banks and their order at 107C sufficient for all of the client's funds. When possible the system will not assign a bank that is in the same state in which the client resides.

Figure 2:
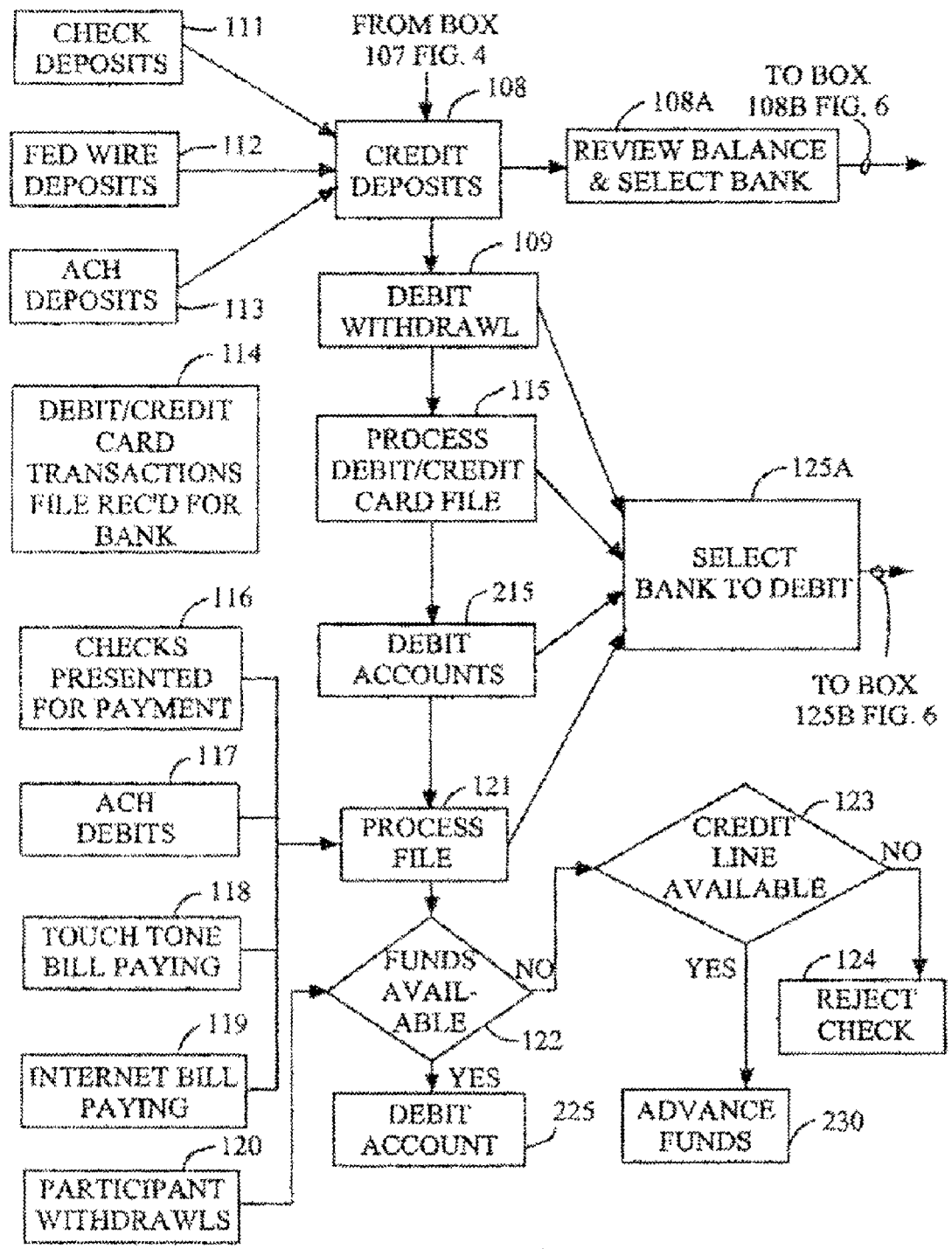
FIG. 2 is a flowchart depicting processing steps regarding the determination of a available funds according to the present invention.
Figure 3:
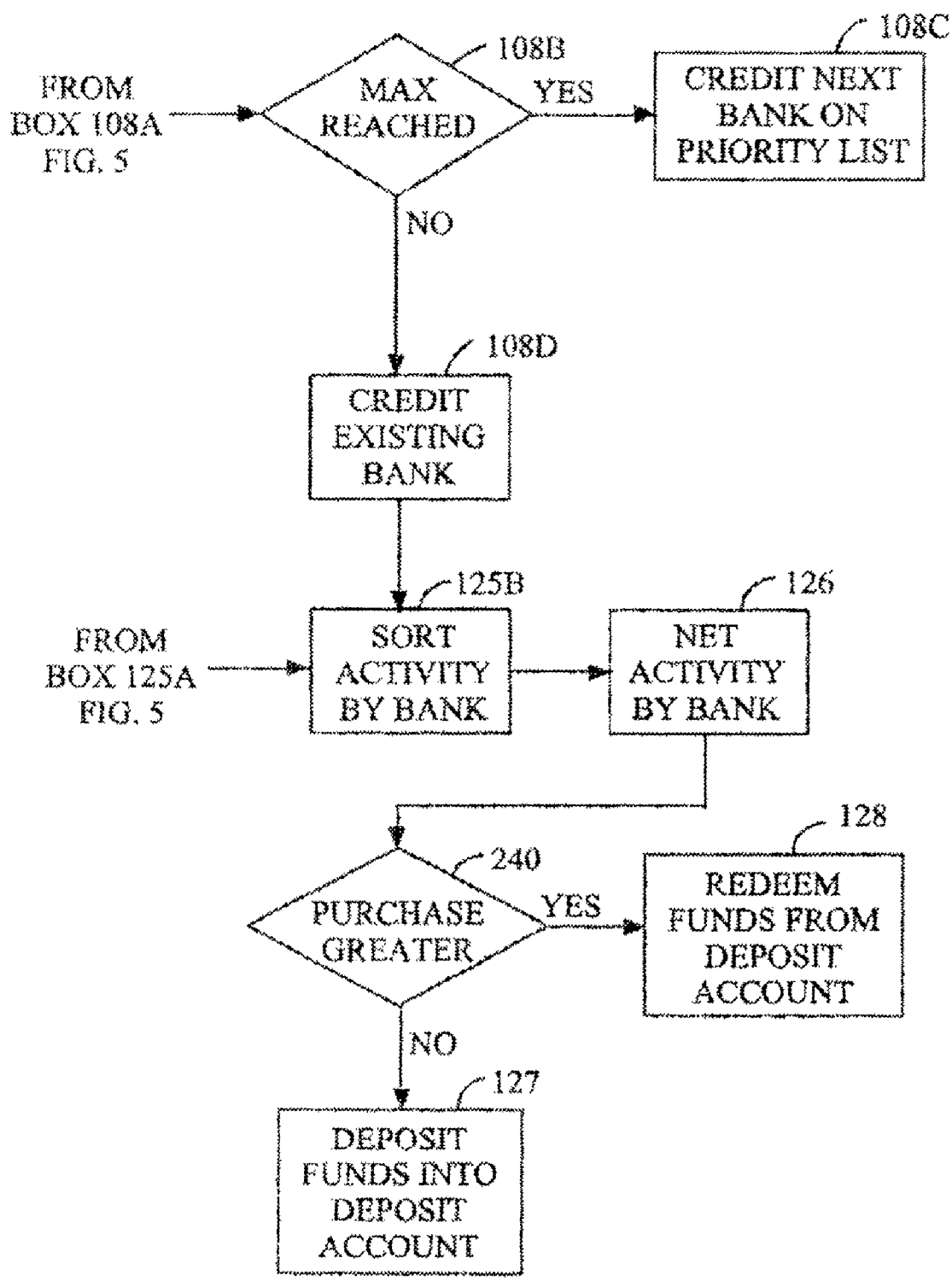
FIG. 3 is a flow chart depicting processing steps associated with the completion of the banking system process according to the present invention.

Referring to FIG. 2 it can be seen that when a deposit, either a check deposit 111, federal wire deposit 112, ACH deposit, sweep, or other deposit is credited to the client's account 108, the system will review where the existing funds of the accounts are deposited 108A. If the client's balance has reached the maximum allowable balance for the existing bank 108B, as shown in FIG. 3, the system will then select the next bank on the preference list attached to the account 108C. If the maximum allowable balance has not been reached in the existing bank, the system will credit the additional funds to that bank 108D.

Still referring to FIG. 2, the procedure for processing withdrawals can be seen. Various methods of withdrawing funds are debit withdrawal 109, processing debit or credit card transactions such as debit/credit card files 115, direct debit accounts 215, and processing of files 121. Processing of a debit/credit card file 115 utilizes data accumulated from debit/credit card transactions received from the banks 114. The processing of file 121 procedure utilizes one of various sources of data such as a check presented for payment 116, ACH debits 117, touch tone bill paying 118, and/or internet bill paying 119.

After processing the debit procedure, the system will review the bank preference list and select the appropriate bank to debit 125A. The system will sort all the daily transactions by the bank 125B (see FIG. 3). The activity for each bank will then be netted 126 and the appropriate deposit or withdrawals made.

The system will then determine whether funds are available 122, which function is also associated with other participant withdrawals 120. If the funds are available, the account is debited 225. If the funds are not available, however, the system determines whether a credit line is available 123. If a credit line is available, then funds are advanced 230 to cover the debit; if not the transaction is rejected 124.

Referring to FIG. 3, as previously stated the system determines whether the client's balance reaches its maximum 108B and if so the next bank on the list selected by the client is credited 108C. If the maximum is not reached the existing bank is credited 108D. Information and activities associated with processed debits and credits of the client's accounts from 125A are sorted by the bank 125B and the net activity by the bank is determined 126. The system then determines whether the deposits and credits were greater than the withdrawals and debits 240 and if so, the excess funds are deposited into a deposit account 127. If the debits and withdrawals were greater than the credits the difference is redeemed from the deposit account 128.

Thus, by practicing this invention, the client is provided with FDIC insurance in excess of $100,000.00 because the client's holdings are maintained in multiple insured deposit accounts, which may be in multiple banks.

The foregoing description is meant to be illustrative and not limiting. Various changes, modifications, and additions may become apparent to the skilled artisan upon a perusal of this specification, and as such are meant to be within the scope and spirit of the invention as defined by the Claims.

What is claimed is:

1. A method for managing a plurality of client demand accounts for one or more clients, wherein the client demand account funds are held in one or more FDIC-insured and interest-bearing aggregated deposit accounts, which are not NOW accounts, at one or more banking institutions, said method comprising:

administering clients' deposits and/or transfers to and withdrawals and/or transfers from each of said client demand accounts, said administering step comprising processing, by one or more computers, transaction data comprising data for each of more than six (6) withdrawals and/or transfers by check and/or debit card and/or ACH debit within a month from each of a plurality of said client demand accounts, with the transaction data comprising a respective amount for each respective withdrawal and/or transfer;

determining, by one or more computers, on a regular basis one or more net transactions, with each net transaction comprising a sum of a plurality of clients' deposits and/or transfers to and/or withdrawals and/or transfers from a plurality of said respective client demand accounts of a plurality of the clients;

causing funds to be deposited and/or transferred to or withdrawn and/or transferred from said one or more of said FDIC-insured and interest-bearing aggregated deposit accounts based on one or more of the net transactions, so that FDIC insurance coverage greater than the maximum FDIC insurance coverage allowed for each depositor in a FDIC-insured banking institution is effectively provided for each client, and wherein more than six (6) transfers and/or withdrawals are made during a month from at least one of said FDIC-insured and interest-bearing aggregated deposit accounts;

updating a database, maintained on one or more computers, comprising information for each client demand account with said deposits and/or transfers to and withdrawals and/or transfers from said each client demand account;

determining, by one or more computers, whether each client's funds held in one of said banking institutions are more than a specified amount; and distributing or facilitating distribution of any amounts over said specified amount into at least one other FDIC-insured and interest-bearing aggregated deposit account at at least one other of said banking institutions.

2. The method of claim 1, wherein clients' funds are deposited and/or transferred to said client demand accounts by at least one method selected from the group consisting of check or draft, wire or electronic transfer, ACH credit, third party credits, and a sweep from another account.

3. The method of claim 1, wherein said specified amount is more than said maximum FDIC insurance coverage minus a predetermined amount but less than or equal to said maximum FDIC insurance coverage.

4. The method of claim 1, further comprising a step of determining a client's preferences for the amount of funds to be held in each of said FDIC-insured and interest-bearing aggregated deposit accounts.

5. The method of claim 1 wherein funds are deposited and/or transferred to or withdrawn and/or transferred from said FDIC-insured and interest-bearing aggregated deposit accounts in dependence on the pre-determined client preferences.

6. The method of claim 1 wherein one or more net transactions are determined for said client demand accounts.

7. The method of claim 1 wherein one or more net transactions are determined for each banking institution.

8. The method of claim 1 wherein funds are deposited and/or transferred to or withdrawn and/or transferred from each banking institution so that each client's funds at a banking institution do not exceed a specified amount.

9. The method of claim 1 further comprising a step of authorizing or rejecting payments requested from at least one client demand account.

10. The method of claim 1 wherein said database comprises, for each client, information concerning the amount of that client's funds held in said FDIC-insured and interest-bearing aggregated deposit accounts in the banking institutions.

11. The method of claim 1 wherein clients' funds are withdrawn and/or transferred from said client demand accounts by at least one method selected from the group consisting of drafts or checks, credit card, debit card, sweeps, wire or electronic transfers, ACH debits, and combinations thereof.

12. The method of claim 1 wherein one or more of the withdrawals and/or transfers from at least one of said FDIC-insured and interest-bearing aggregated deposit accounts are requested in person.

13. The method of claim 1 wherein one or more of the withdrawals and/or transfers from at least one of said FDIC-insured and interest-bearing aggregated deposit accounts are requested by mail.

14. The method of claim 1 wherein one or more of the withdrawals and/or transfers from at least one of said FDIC-insured and interest-bearing aggregated deposit accounts are requested by messenger.

15. The method of claim 1 wherein one or more of the withdrawals and/or transfers from at least one of said FDIC-insured and interest-bearing aggregated deposit accounts are requested by telephone and distributed by mail.

16. The method of claim 1 wherein one or more of the withdrawals and/or transfers from at least one of said FDIC-insured and interest-bearing aggregated deposit accounts are requested by automated teller machine.

17. A method for managing a plurality of client demand accounts, the funds for the client demand accounts being held in one or more insured and interest-bearing aggregated deposit accounts, which are not NOW accounts, at one or more banking institutions, said method comprising:

administering client deposit, withdrawal, and transfer transactions against their client demand accounts by crediting or debiting client funds in said insured and interest-bearing aggregated deposit accounts so that each client's funds held in each banking institution do not exceed a specified amount, said administering step comprising processing, by one or more computers, transaction data comprising data for each of more than six (6) withdrawals and/or transfers by check and/or debit card and/or ACH debit within a month from each of a plurality of said client demand accounts, with the transaction data comprising a respective amount for each respective withdrawal and/or transfer;

determining, by one or more computers, on a regular basis one or more net transactions, with each net transaction comprising a sum of the credited and/or debited transactions from a plurality of said respective client demand accounts of a plurality of the clients;

on a regular basis, causing funds to be deposited and/or transferred to or withdrawn and/or transferred from one or more of said insured and interest-bearing aggregated deposit accounts at one or more of said banking institutions in dependence on one or more of the net transactions, wherein more than six (6) withdrawals and/or transfers are made during a month from at least one of said insured and interest-bearing aggregated deposit accounts;

updating a database, maintained on one or more computers, comprising client information for each client demand account with said transactions received against said client demand accounts;

determining, by one or more computers, whether each client's funds at one of said banking institutions are more than a specified amount; and distributing or facilitating distribution of any amounts over said specified amount into at least one other insured and interest-bearing aggregated deposit account at at least one other of said banking institutions.

18. The method of claim 17 wherein the specified amount is more than the maximum FDIC insurance coverage allowed for each depositor in a FDIC-insured banking institution minus a predetermined amount but less than or equal to said maximum FDIC insurance coverage so that FDIC insurance coverage greater than said maximum FDIC insurance coverage is effectively provided for each client.

19. The method of claim 17, wherein clients' funds are deposited and/or transferred into said client demand accounts by at least one method selected from the group consisting of check or draft, wire or electronic transfer, ACH credit, third party credits, and a sweep from another account.

20. The method of claim 17 wherein clients' funds are withdrawn and/or transferred from said client demand accounts by at least one method selected from the group consisting of drafts or checks, credit card, debit card, sweeps, wire or electronic transfers, ACH debits, and combinations thereof.

21. The method of claim 17 wherein said insured and interest-bearing aggregated deposit accounts are selected for crediting client deposits and/or transfers to said client demand account and debiting client withdrawals and/or transfers from said client demand account in dependence on predetermined client preferences.

22. The method of claim 17 wherein one or more of the withdrawals and/or transfers from at least one of said insured and interest-bearing aggregated deposit accounts are requested in person.

23. The method of claim 17 wherein one or more of the withdrawals and/or transfers from at least one of said insured and interest-bearing aggregated deposit accounts are requested by mail.

24. The method of claim 17 wherein one or more of the withdrawals and/or transfers from at least one of said insured and interest-bearing aggregated deposit accounts are requested by messenger.

25. The method of claim 17 wherein one or more of the withdrawals and/or transfers from at least one of said insured and interest-bearing aggregated deposit accounts are requested by telephone and distributed by mail.

26. The method of claim 17 wherein one or more of the withdrawals and/or transfers from at least one of said insured and interest-bearing aggregated deposit accounts are requested by automated teller machine.

27. A method for managing a plurality of client demand accounts for one or more clients, wherein the client demand account funds are held in one or more insured money market aggregated deposit accounts, which are not NOW accounts, at one or more banking institutions, the method comprising:

providing a database, maintained on one or more computers, comprising client information for each client demand account;

administering clients' deposits and/or transfers to and withdrawals and/or transfers from their client demand accounts, said administering step comprising processing, by one or more computers, transaction data comprising data for each of more than six (6) withdrawals and/or transfers by check and/or debit card and/or ACH debit within a month from each of a plurality of said client demand accounts, with the transaction data comprising a respective amount for each respective withdrawal and/or transfer;

authorizing or rejecting the use of funds in a particular client's demand account for each payment requested from that client's demand account;

determining, by one or more computers, on a regular periodic basis one or more net transactions, with each net transaction comprising a sum of a plurality of said clients' deposits and/or transfers to and/or withdrawals and/or transfers from a plurality of the respective client demand accounts of a plurality of the clients;

depositing and/or transferring funds to or withdrawing and/or transferring funds from one or more of said insured money market aggregated deposit accounts based on one or more of the net transactions, so that FDIC insurance coverage greater than the maximum FDIC insurance coverage allowed for each depositor in a FDIC-insured banking institution is effectively provided for each client, wherein more than six (6) withdrawals and/or transfers are made during a month from at least one of said insured money market aggregated deposit accounts;

wherein the depositing and/or transferring funds to or withdrawing and/or transferring funds from step further comprises determining, by one or more computers, whether each client's funds held in one of said banking institutions are more than a specified amount; and distributing or facilitating distribution of any amounts over said specified amount into at least one other insured money market deposit account at at least one other of said banking institutions;

distributing or facilitating distribution of interest paid on at least one of said insured money market aggregated deposit accounts to said clients' demand accounts; and updating said database with each client's deposit and authorized payment.

28. The method of claim 27, wherein at least one withdrawal or transfer from at least one client demand account is made by a method selected from the group consisting of drafts or checks, credit card, debit card, sweeps, wire or electronic transfers, ACH debits, and combinations thereof.

29. The method of claim 27, wherein at least one deposit or transfer into at least one client demand account is made by a method selected from the group consisting of check or draft, wire or electronic transfer, ACH credit, third party credits, and a sweep from one of the client's other accounts another account.

30. The method of claim 27 wherein one or more of the withdrawals and/or transfers from at least one of said insured money market aggregated deposit accounts are requested in person.

31. The method of claim 27 wherein one or more of the withdrawals and/or transfers from at least one of said insured money market aggregated deposit accounts are requested by mail.

32. The method of claim 27 wherein one or more of the withdrawals and/or transfers from at least one of said insured money market aggregated deposit accounts are requested by messenger.

33. The method of claim 27 wherein one or more of the withdrawals and/or transfers from at least one of said insured money market aggregated deposit accounts are requested by telephone and distributed by mail.

34. The method of claim 27 wherein one or more of the withdrawals and/or transfers from at least one of said insured money market aggregated deposit accounts are requested by automated teller machine.

35. The method of claim 17 further comprising a step of updating said database comprising information for each client demand account with the clients' deposits, withdrawals, and transfers, and with the amount of that client's funds held in said one or more insured and interest-bearing aggregated deposit accounts and in said one or more banking institutions.

36. The method of claim 17 further comprising a step of authorizing or rejecting payments requested from at least one client's demand account.

37. The method of claim 17 further comprising a step for distributing or facilitating distribution of interest earned on at least one of said insured and interest-bearing aggregated deposit accounts among said client demand accounts.

38. A method for managing a plurality of client transaction accounts for one or more clients, wherein the client transaction account funds are held in one or more insured money market aggregated deposit accounts, which are not NOW accounts, at one or more banking institutions, said method comprising:
    administering clients' deposits and/or transfers to and withdrawals and/or transfers from each of said client transaction accounts, said administering step comprising processing, by one or more computers, transaction data comprising data for each of more than six (6) withdrawals and/or transfers by check and/or debit card and/or ACH debit within a month from each of a plurality of said client transaction accounts, with the transaction data comprising a respective amount for each respective withdrawal and/or transfer;
    determining, by one or more computers, on a regular basis one or more net transactions, with each net transaction comprising a sum of a plurality of clients' deposits and/or transfers to and/or client withdrawals and/or transfers from a plurality of said respective client transaction accounts of a plurality of the clients;
    causing funds to be deposited and/or transferred to or withdrawn and/or transferred from one or more of said insured money market aggregated deposit accounts based on one or more of the net transactions, and wherein more than six (6) withdrawals and/or transfers are made during a month from at least one of said insured money market aggregated deposit accounts;
    updating a database, maintained on one or more computers, comprising information for each client transaction account with that client's deposits and/or transfers to and withdrawals and/or transfers from said each client transaction account;
    determining, by one or more computers, whether each client's funds held in one of said banking institutions are more than a specified amount; and
    distributing or facilitating distribution of any amounts over said specified amount into at least one other insured money market aggregated deposit account at at least one other of said banking institutions, so that FDIC insurance coverage greater than the maximum FDIC insurance coverage allowed for each depositor in a FDIC-insured banking institution is effectively provided for each client.

39. The method of claim 38, further comprising
    wherein the client transaction account funds for at least one client are held in insured money market aggregated deposit accounts among a fixed plurality of banking institutions so that FDIC insurance coverage greater than the maximum FDIC insurance coverage is obtained for that client.

40. The method of claim 38 further comprising a step of distributing or facilitating distribution of interest earned on at least one of said insured money market aggregated deposit accounts among said client transaction accounts.

41. The method of claim 38 wherein at least one net transaction is determined for each of one or more banking institutions.

42. The method of claim 38, wherein clients' funds are deposited and/or transferred into said client transaction accounts by at least one method selected from the group consisting of check or draft, wire or electronic transfer, ACH credit, third party credits, and a sweep from another account.

43. The method of claim 38 wherein clients' funds are withdrawn and/or transferred from said client transaction accounts by at least one method selected from the group consisting of drafts or checks, credit card, debit card, sweeps, wire or electronic transfers, ACH debits, and combinations thereof.

44. The method of claim 38, further comprising a step of determining a client's preferences for the amount of funds to be held in each of said insured money market aggregated deposit accounts, and wherein funds are deposited and/or transferred to or withdrawn and/or transferred from said insured money market aggregated deposit accounts in dependence on the pre-determined client preferences.

45. The method of claim 38 wherein said database comprises, for each client, information concerning the amount of that client's funds held in said insured money market aggregated deposit accounts and the in banking institutions.

46. The method of claim 38 wherein one or more of the withdrawals and/or transfers from at least one of said insured money market aggregated deposit accounts are requested in person.

47. The method of claim 38 wherein one or more of the withdrawals and/or transfers from at least one of said insured money market aggregated deposit accounts are requested by mail.

48. The method of claim 38 wherein one or more of the withdrawals and/or transfers from at least one of said insured money market aggregated deposit accounts are requested by messenger.

49. The method of claim 38 wherein one or more of the withdrawals and/or transfers from at least one of said insured money market aggregated deposit accounts are requested by telephone and distributed by mail.

50. The method of claim 38 wherein one or more of the withdrawals and/or transfers from at least one of said insured money market aggregated deposit accounts are requested by automated teller machine.

51. The method of claim 3, wherein said predetermined amount is approximately $10,000.

52. The method of claim 18, wherein said predetermined amount is approximately $10,000.

53. A method for managing a plurality of individual client accounts for multiple clients, comprising the steps of:
maintaining funds for said individual client accounts in one or more FDIC-insured, interest-bearing aggregated deposit accounts at one or more banking institutions;
processing, by one or more computers, transactions data comprising data for each of one or more deposits/transfers to one or more client accounts and transaction data comprising data for each of more than six (6) withdrawals/transfers by check and/or debit card and/or ACH debit within a month from each of a plurality of said client accounts, with the transaction data comprising a respective amount for each respective withdrawal/transfer;
netting transactions using one or more computers, on a regular basis, of a plurality of the client accounts of a plurality of the clients to obtain a transaction net, with each transaction net comprising clients' deposits/transfers to and/or withdrawals/transfers from a plurality of said respective client accounts of a plurality of the clients; and
making needed deposits to, or needed withdrawals/transfers from one or more of said aggregated deposit accounts based on said transaction net so that FDIC insurance coverage greater than the maximum FDIC insurance coverage allowed for each depositor in a FDIC-insured banking institution is effectively provided for each client, and wherein more than six (6) withdrawals/transfers are made during a month from at least one of said one or more aggregated deposit accounts;
wherein the making needed deposits to or needed withdrawals/transfers from step further comprises
determining, by one or more computers, whether each client's funds held in one of said banking institutions are more than a specified amount; and
distributing or facilitating distribution of any amounts over said specified amount into at least one other insured money market aggregated deposit account at at least one other of said banking institutions.

54. The method of claim 53, wherein one or more of said withdrawals/transfers from at least one of said one or more aggregated deposit accounts are requested in person.

55. The method of claim 53, wherein one or more of said withdrawals/transfers from at least one of said one or more aggregated deposit accounts are requested by mail.

56. The method of claim 53, wherein one or more of said withdrawals/transfers from at least one of said one or more aggregated deposit accounts are requested by messenger.

57. The method of claim 53, wherein one or more of said withdrawals/transfers from at least one of said one or more aggregated deposit accounts are requested by telephone and distributed by mail.

58. The method of claim 53, wherein one or more of said withdrawals/transfers from at least one of said one or more aggregated deposit accounts are requested by automated teller machine.

59. A method for managing a plurality of individual client accounts for multiple clients, comprising the steps of:
receiving transaction data for a plurality of said individual client accounts through an electronic interface;
processing, by one or more computers, transaction data comprising data for each of one or more deposits/transfers to one or more of the plurality of client accounts and transaction data comprising data for each of more than six (6) withdrawals/transfers by check and/or debit card and/or ACH debit within a month from each of a plurality of said client accounts, with the transaction data comprising a respective amount for each respective deposit/transfer or withdrawal/transfer;
netting said transaction data, using one or more computers, on a regular basis to obtain netted transaction data comprising a sum of clients' deposits/transfers to and/or withdrawals/transfers from a plurality of said respective client demand accounts of a plurality of the clients;
determining, by one or more computers, needed deposits/transfers to, or needed withdrawals/transfers from, one or more of said FDIC-insured, interest-bearing aggregated deposit accounts at one or more of said banking institutions based on said netted transaction data, wherein said one or more of said aggregated deposit accounts hold funds for said individual client accounts; and
generating instructions to make, for said one or more aggregated deposit accounts, said needed deposits/transfers to, or said needed withdrawals/transfers from, said one or more of said aggregated deposit accounts so that FDIC insurance coverage greater than the maximum FDIC insurance coverage allowed for each depositor in a FDIC-insured banking institution is effectively provided for each client, and wherein more than six (6) withdrawals/transfers from at least one of said one or more aggregated deposit accounts are made during a month;
wherein the generating instructions step further comprises
determining, by one or more computers, whether each client's funds held in one of said banking institutions are more than a specified amount; and
distributing or facilitating distribution of any amounts over said specified amount into at least one other insured interest-bearing aggregated deposit account at at least one other of said banking institutions.

60. The method of claim 59, wherein one or more of said withdrawals/transfers from at least one of said one or more aggregated deposit accounts are requested in person.

61. The method of claim 59, wherein one or more of said withdrawals/transfers from at least one of said one or more aggregated deposit accounts are requested by mail.

62. The method of claim 59, wherein one or more of said withdrawals/transfers from at least one of said one or more aggregated deposit accounts are requested by messenger.

63. The method of claim 59, wherein one or more of said withdrawals/transfers from at least one of said one or more aggregated deposit accounts are requested by telephone and distributed by mail.

64. The method of claim 59, wherein one or more of said withdrawals/transfers from at least one of said one or more aggregated deposit accounts are requested by automated teller machine.

65. The method of claim 27, further comprising
wherein the client demand account funds for at least one client are held in insured money market aggregated deposit accounts among a fixed plurality of banking institutions so that FDIC insurance coverage greater than the maximum FDIC insurance coverage is obtained for that client.

66. The method of claim 53, further comprising
wherein the client account funds for at least one client are held in insured interest-bearing aggregated deposit accounts among a fixed plurality of banking institutions so that FDIC insurance coverage greater than the maximum FDIC insurance coverage is obtained for that client.

67. The method of claim 59, further comprising
wherein the client account funds for at least one client are held in insured interest-bearing aggregated deposit accounts among a fixed plurality of banking institutions so that FDIC insurance coverage greater than the maximum FDIC insurance coverage is obtained for that client.

68. The method of claim 27, further comprising a step of determining a client's preferences for the amount of funds to be held in each of said insured money market aggregated deposit accounts, and wherein funds are deposited and/or transferred to or withdrawn and/or transferred from said insured money market aggregated deposit accounts in dependence on the pre-determined client preferences.

69. The method of claim 53, further comprising a step of determining a client's preferences for the amount of funds to be held in each of said insured interest-bearing aggregated deposit accounts, and wherein funds are deposited/transferred to or withdrawn/transferred from said insured interest-bearing aggregated deposit accounts in dependence on the pre-determined client preferences.

70. The method of claim 59, further comprising a step of determining a client's preferences for the amount of funds to be held in each of said insured interest-bearing aggregated deposit accounts, and wherein funds are deposited/transferred to or withdrawn/transferred from said insured interest-bearing aggregated deposit accounts in dependence on the pre-determined client preferences.

* * * * *